United States Patent
Su

(10) Patent No.: US 8,150,314 B2
(45) Date of Patent: Apr. 3, 2012

(54) REMOTE ANTIJAMMING TRANSMISSION DEVICE AND METHOD FOR THE SAME

(76) Inventor: Keng Kuei Su, Kaohsiung (TW)

(*) Notice: Subject to any disclaimer, the term of this patent is extended or adjusted under 35 U.S.C. 154(b) by 663 days.

(21) Appl. No.: 12/330,831

(22) Filed: Dec. 9, 2008

(65) Prior Publication Data

US 2010/0142628 A1   Jun. 10, 2010

(51) Int. Cl.
*H04B 5/00* (2006.01)
(52) U.S. Cl. .................................................. 455/41.1
(58) Field of Classification Search ............... 455/40, 455/41.1, 63.1, 114.2, 500, 501
See application file for complete search history.

(56) References Cited

U.S. PATENT DOCUMENTS

| | | | |
|---|---|---|---|
| 6,237,417 B1 * | 5/2001 | Lonsdale et al. | 73/579 |
| 7,508,946 B2 * | 3/2009 | Yamagata et al. | 380/270 |
| 7,516,479 B2 * | 4/2009 | Kurita | 726/2 |

* cited by examiner

*Primary Examiner* — Jeffrey Zweizig
(74) *Attorney, Agent, or Firm* — Rosenberg, Klein & Lee

(57) ABSTRACT

A remote antijamming transmission device and method for the same is provided. A signal current transmission line is between the host and the sub-machine arranged along a path of signal current transmission line and kept at a distance from the signal current transmission line. The sub-machine comprises a signal sensor component. The interval is a range where the signal sensor component may sense a signal current transmitted by the host connected to the sub-machine in a non-contact manner. Thus, no load effect is caused. The signal current transmitted by the host is not attenuated due to current bypass, so the effect of remote transmission is achieved. The transmission current in the signal current transmission line does not make the transmission signal to be attenuated even if the amount of sub-machines increases and then the current is divided. Unlimited amounts of sub-machines may be arranged near the signal current transmission line.

9 Claims, 4 Drawing Sheets

REMOTE ANTIJAMMING TRANSMISSION DEVICE AND METHOD FOR THE SAME

BACKGROUND OF THE INVENTION

1. Field of the Invention

This invention relates to a remote antijamming transmission device and method for the same and particularly to a transmission device and method for the same that uses a signal current as a transmission medium.

2. Description of the Related Art

Tanks to progressive technology, a conventional one-to-one transmission device is advanced to a one-to-multiple transmission device, such as the devices used for video and audio transmission, automatic control transmission, digital or analog signal transmission and the like, which transmits a signal from a host to its corresponding sub-machine for increasing the efficiency of signal transmission. With reference to FIG. 1, regarding an existing signal transmission device, a host (1) transmits the signal to multiple sub-machines (10, 11, 12, and 13) as transmission devices that are mainly connected in parallel. When the host (1) transmits a control signal correspondingly to one of the sub-machines, for example, a sub-machine (10), the sub-machine (10) is enabled.

However, when the multiple sub-machines (10, 11, 12, and 13) are connected in parallel to each other in a signal transmission line, because the signal transmission line is prolonged, the resistance of signal transmission line increases and the input load impedance of each of the sub-machines (10, 11, 12, and 13) decreases, thereby the signal voltage obtained from the sub-machines (10, 11, 12, and 13) being lowered. When the multiple sub-machines connected in parallel are used and even the signal transmitted by the host (1) cannot be acknowledged, the sub-machines do not work. Thus, a great amount of sub-machines cannot be installed in the process of remote signal transmission and the efficiency of signal transmission is poor. Then, the signal voltage transmitted from the host (1) is transmitted to a distance place, so the signal transmission line easily causes unexpected noise jamming. Alternatively, an electromagnetic interference voltage is applied to the signal voltage, so the signal cannot be fully transmitted to the remote without being distorted and thus the effect of remote antijamming transmission cannot be achieved. Later, each of repeaters that is provided with an amplifier is arranged in the signal transmission at a distance of intervals, and thus an attenuated signal is amplified by the amplifier and then transmitted. In such a manner, the noise is also amplified and the transmission speed is significantly down. Further, generally in a conventional signal transmission device, the voltage is a signal transmission medium; when being caused in the signal transmission line, the interference voltage is applied to the signal voltage. The transmission signal cannot be fully transmitted to the sub-machines (10, 11, 12, and 13). Thus, the conventional remote transmission device has the issues, so how to improve the conventional remote signal transmission device is a goal that should be reached.

Consequently, because of the technical defects of described above, the applicant keeps on carving unflaggingly through wholehearted experience and research to develop the present invention, which can effectively improve the defects described above.

SUMMARY OF THE INVENTION

To solve the mentioned-above defects of prior art, a remote antijamming transmission device and method for the same according to this invention is provided that drives a host transmitting terminal and sub-machine receiving terminals to transmit signals in a non-contact manner. Thus, a load effect is not caused in a signal transmission line and a great amount of sub-machines may be connected in series to the transmission device. A signal current in the signal transmission line may be transmitted to the mote and cannot be attenuated, so the signal current forms a constant current source and the sub-machines may receive a precise and complete signal, which is the main object of this invention.

In order to achieve the objective mentioned above, a technical means provided in this invention is the remote antijamming transmission device and method for the same, comprising a host and a sub-machine.

The host comprises a CPU, a first signal processing unit, and a first transmission unit. The first CPU may process an address encoding and control signal and all digital signals. The first signal processing unit is electrically connected to the first CPU and may process the address encoding and control signal and all analog signals. The first transmission unit transmits to the sub-machine the analog and digital signals processed by the first signal processing unit.

The sub-machine comprises a signal sensor component, a second signal processing unit, a second CPU, and a drive unit. The signal sensor component may sense the signal transmitted by the host. The second signal processing unit is electrically connected to the signal sensor component to receive the processed signal sensed by the signal sensor component. The second CPU is electrically connected to the second signal processing unit to operate and encode the signal processed by the second signal processing unit. The drive unit uses the signal encoded by the second CPU to drive a load. The load is electrically connected to the drive unit.

Further, a signal current transmission line is provided between the host and the sub-machine. The sub-machine is arranged along a path of the signal current transmission line and kept at a distance from the signal current transmission line. The interval is a range where the signal sensor component may sense a signal current transmitted by the host.

In a method of remote antijamming transmission, a signal current transmission line is provided between a signal transmission terminal and a signal receiving terminal. The signal receiving terminal is arranged along a path of the signal current transmission line and kept at a distance from the signal current transmission line. The signal receiving terminal uses a sensor component to sense a signal transmitted by the signal transmission terminal. The interval is a range where the signal sensor component may sense a signal current transmitted by the signal transmission terminal.

The host and the sub-machine transmit the signal in a non-contact manner for achievement of exact remote signal transmission and multiple effects.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
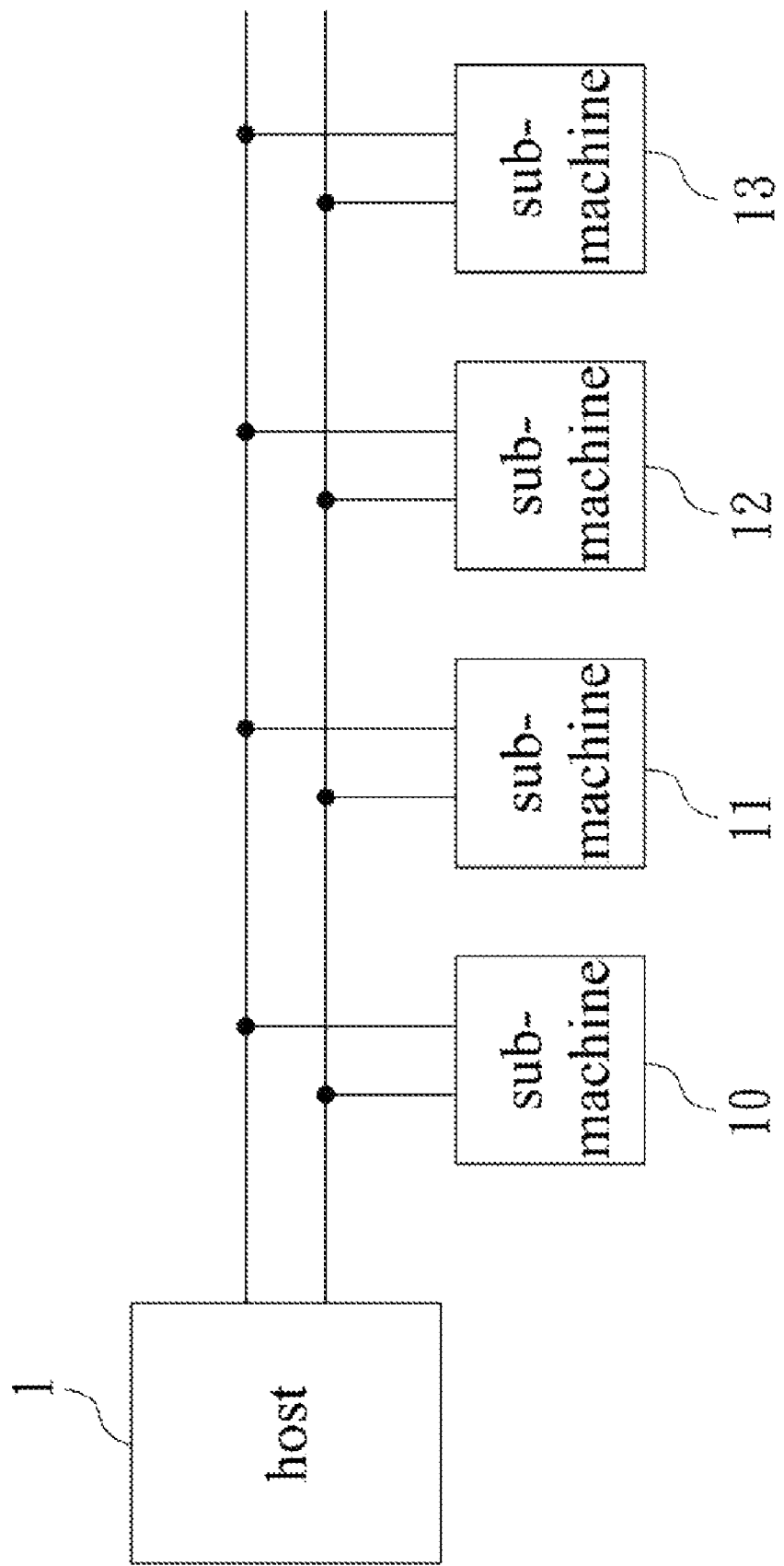
FIG. 1 is a schematic view illustrating a conventional art.
Figure 2:
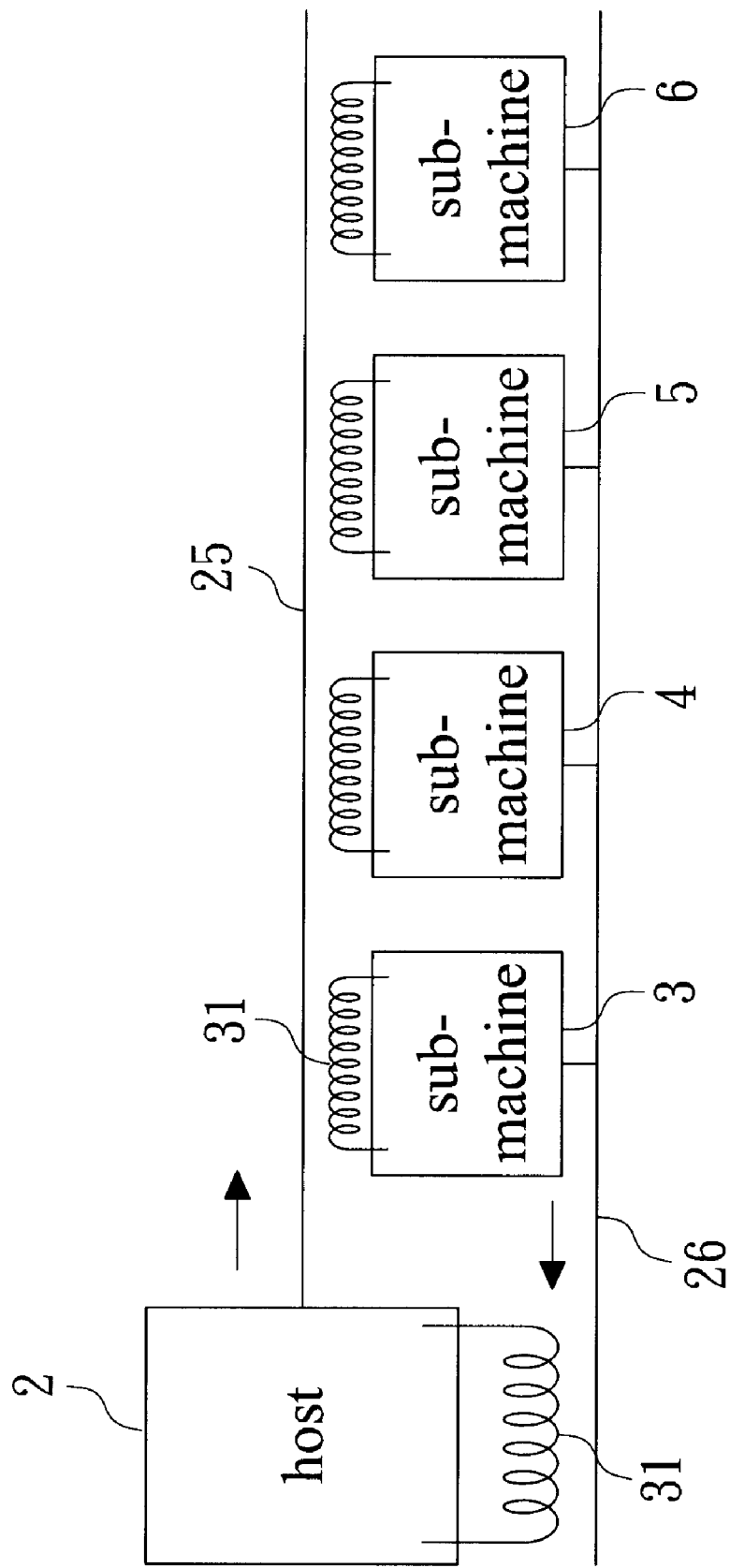
FIG. 2 is a schematic view illustrating this invention.
Figure 3:
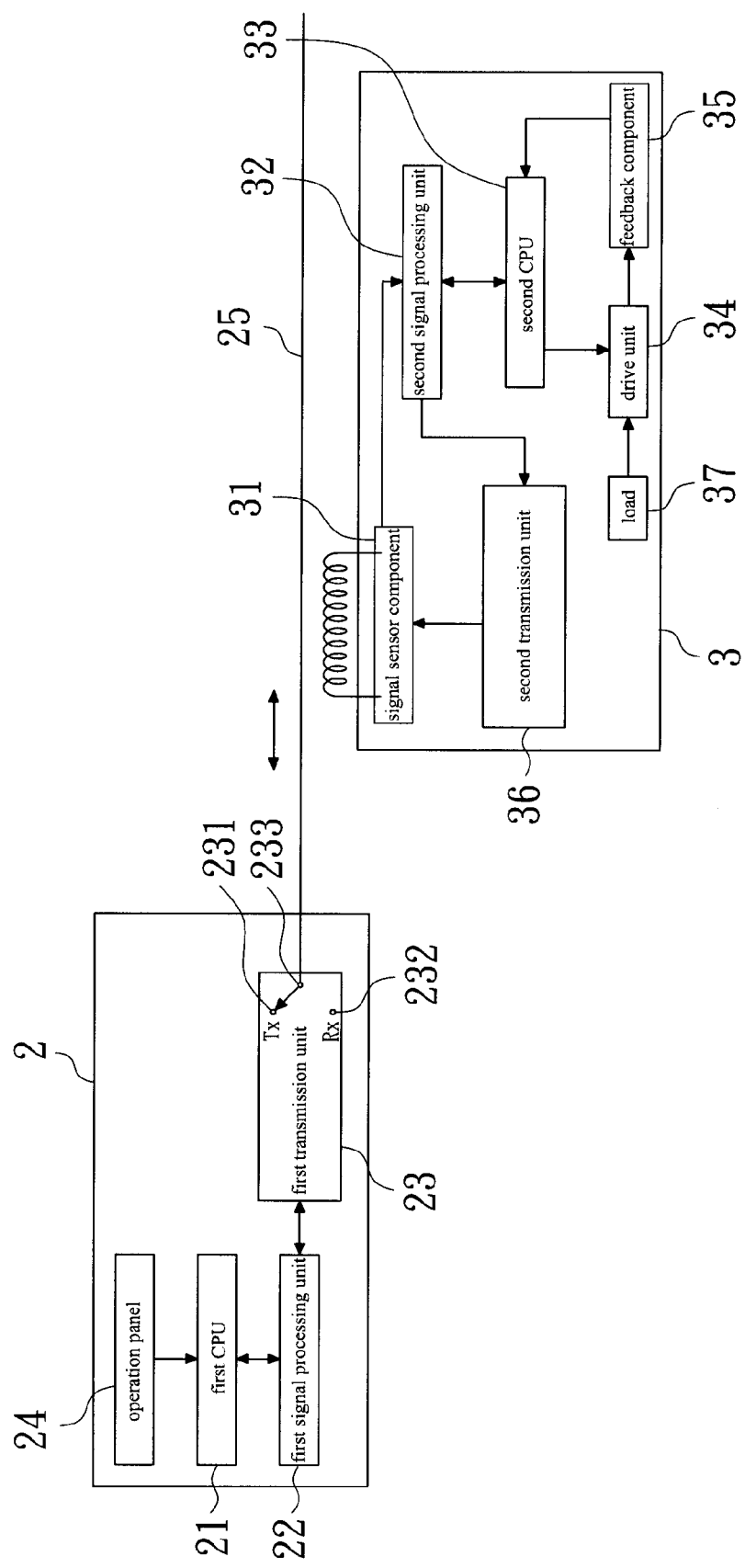
FIG. 3 is a schematic view illustrating a first embodiment of this invention.
Figure 4:
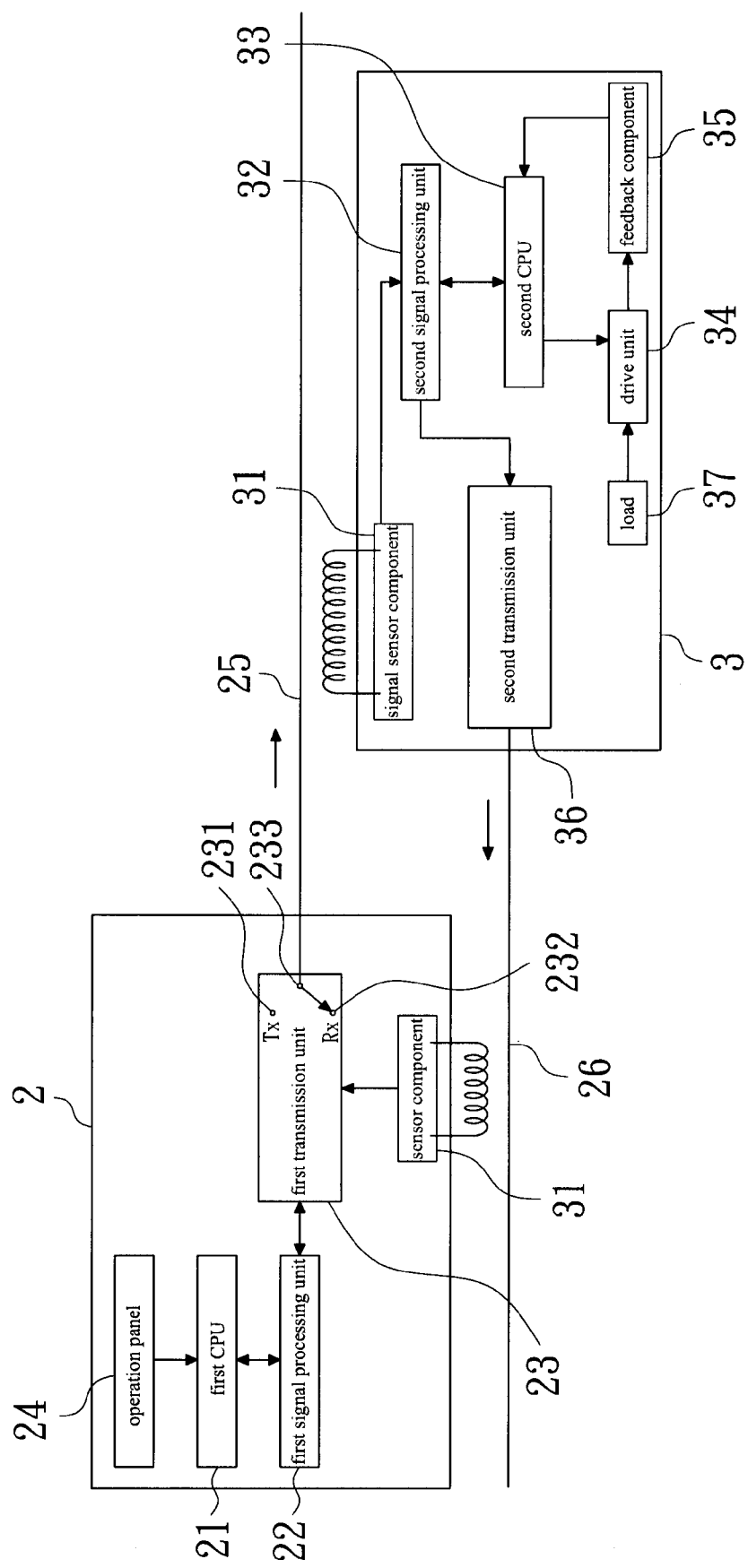
FIG. 4 is a schematic view illustrating a second embodiment of this invention.

With reference to FIGS. 2 and 3, a remote antijamming transmission device and method for the same is provided in a first preferred embodiment of this invention, comprising a host (2) and a plurality of sub-machines (3, 4, 5, and 6) Further, a signal current transmission line (25) is provided between the host (2) and the sub-machines (3, 4, 5, and 6). The sub-machines (3, 4, 5, and 6) are arranged along a path of the signal current transmission line (25) and kept at a distance from the signal current transmission line (25). Each of the sub-machines (3, 4, 5, and 6) comprises a signal sensor component (31). The interval is a range where the signal sensor component (31) may sense a signal current transmitted by the host (2). Refer to FIGS. 3 and 4 illustrating the connection of the host (2) to the sub-machine (3) for the details.

The host (2) comprises a CPU (21), a first signal processing unit (22), a first transmission unit (23), and an operation panel (24). The first CPU (21) may process an address encoding and control signal and all digital signals. The first signal processing unit (22) is electrically connected to the first CPU (21) and may process the address encoding and control signal and all analog signals. The first transmission unit (23) transmits to the sub-machine (3) the analog and digital signals processed by the first signal processing unit (22). The operation panel (24) is electrically connected to the first CPU (21).

The sub-machine (3) comprises a second signal processing unit (32), a second CPU (33), a drive unit (34), a feedback component (35), and a second transmission unit (36). The second signal processing unit (32) is electrically connected to the signal sensor component (31) to process the processed signal sensed by the signal sensor component (31). The second CPU (33) is electrically connected to the second signal processing unit (32) to operate and encode the signal processed by the second signal processing unit (32). The drive unit (34) uses a signal executed by the second CPU (33) to drive a load (37), such as a lamp, an audio and video device and the like, in which the load (37) is electrically connected to the drive unit (34). The feedback component (35) is electrically connected to the drive unit (34) and the second CPU (33) and may detect and transmit a feedback signal formed after the load (37) works to the second CPU (33). The second transmission unit (36) is electrically connected to the second signal processing unit (32) to transmit the feedback signal from the sub-machine (3) to the host (2).

The first transmission unit (23) of the host (2) is provided with a first transmission terminal (231), a first receiving terminal (232), and a switch (233). The first switch (233) is controlled by the first CPU (21) to switch a signal transmission direction to the first transmission terminal (231) and the first receiving terminal (232) and make the host (2) transmit the signal or receive the feedback signal.

When being ready to control one sub-machine (3) in the device through the host (2), a user may use the operation panel (24) to directly give a command the host (2). The host (2) generates an address encoding and control signal corresponding to only the sub-machine (3) outputted by the first CPU (21). Further, after being processed by the first signal processing unit (22), the address encoding and control signal outputted by the first CPU (21) is transmitted from the first transmission terminal (231) of the first transmission unit (23) to the sub-machine (3) along a signal current transmission line (25). When the signal is transmitted, the first CPU (21) controls the signal transmission direction of the first switch (233) of first transmission unit (23) and the first transmission terminal (231) is switched to the first receiving terminal (232) to receive the feedback signal from the sub-machine (3).

After the sub-machine (3) uses the signal sensor component (31) to sense the signal, the signal is rectified and amplified by the second signal processing unit (32), and after being converted into a signal voltage, the signal current is operated and decoded by the second CPU (33) and a control signal is outputted to the drive unit (34) to drive the load (37). After detecting the load (37) that works, the feedback component (35) outputs a feedback signal to the second CPU (33) to operate and execute the signal; then, after the second signal processing unit (32) converts the signal voltage into the signal current, the feedback signal is transmitted by the second transmission unit (36) and the signal sensor component (31) to the host (2) from the signal current transmission line (25).

Here, the feedback signal is received by the first receiving terminal (232) in the first transmission unit (23) of the host (2) and transmitted to the first signal processing unit (22) to rectify and amplify; after the signal current is converted into the signal voltage, it is then outputted to the first CPU (21) for achievement of full control and signal feedback after the load (37) works.

With reference to FIG. 4 illustrating a second preferred embodiment of this invention, a feedback signal transmission line (26) is provided between the host (2) and the sub-machine (3). The host (2) is arranged along a path of the feedback signal transmission line (26) and kept at a distance from the feedback signal transmission line (26). The host (2) further comprises a signal sensor (31) electrically connected to the first transmission unit (23). The interval is a range where the signal sensor component (31) may sense a signal transmitted by the sub-machine (3).

The path where the signal is transmitted by the host (2) is the same as that in the first embodiment. In the embodiment, the signal feedback path is where the feedback signal transmitted by the sub-machine (3) is transmitted from the second transmission unit (36) through the feedback signal transmission line (26) to the host (2) and sensed by the signal sensor component (31). Here, the feedback signal sensed by the signal sensor component (31) is transmitted from the first receiving terminal (232) of the first transmission unit (23) and transmitted to the first signal processing unit (22) to rectify and amplify; after the signal current is converted into the signal voltage, it is then outputted to the first CPU (21) and then decoded for achievement of full control and signal feedback after the load (37) works.

The signal sensor component (31) may be selected from a Hall sensor IC or a coil. The coil may be arranged near the signal current transmission line (25) and the feedback signal transmission line (26) and may also wraps around the signal current transmission line (25) and the feedback signal transmission line (26) in a non-contact manner.

The sub-machines (3, 4, 5, and 6) according to this invention are arranged along a path of the signal current transmission line (25) and kept at a distance from the signal current transmission line (25) and use the current as a signal transmission medium. Thus, this invention is improved more than the prior art, as mentioned below.

1. The signal receiving terminal is arranged in the signal current transmission line (25) "in the non-contact manner"; thus, no load effect is caused in the signal current transmission line (25) and almost unlimited amounts of sub-machines may be thereby arranged.
2. Constant current source: The signal current outputted by the host (2) does not vary with many loads and may thereby be transmitted to the remote. The current passing through a single lead wire is not attenuated, even if the signal current transmission line (25) increases, so the signal current is formed into a constant current source, the remote signal transmission being thereby achieved.

3. The signal current is not easily attenuated, no amplifier provided in the repeater is required in the transmission path during signal transmission and the speed of signal transmission cannot be lowered, thereby the cost of equipment being reduced.

4. Antijamming: The variation of voltage out of the transmission line cannot make the quantity of current in the line change, so the interference voltage does not cause any interference source in the signal current transmission line (25).

In a method of remote antijamming transmission, a signal current transmission line (25) is provided between a signal transmission terminal and a signal receiving terminal. The signal receiving terminal is arranged along a path of the signal current transmission line (25) and kept at a distance from the signal current transmission line (25). The signal receiving terminal uses a signal sensor component (31) to sense a signal transmitted by the signal transmission terminal. The interval is a range where the signal sensor component (31) may sense a signal current transmitted by the signal transmission terminal.

The signal transmission terminal is a host (2), while the signal receiving terminal is a sub-machine (3).

The host (2) comprises a CPU (21), a first signal processing unit (22), a first transmission unit (23), and an operation panel (24). The first CPU (21) may process an address encoding and control signal and all digital signals. The first signal processing unit (22) is electrically connected to the first CPU (21) and may process the address encoding and control signal and all analog signals. The first transmission unit (23) transmits to the sub-machine (3) the analog and digital signals processed by the first signal processing unit (22). The operation panel (24) is electrically connected to the first CPU (21).

The sub-machine (3) comprises a second signal processing unit (32), a second CPU (33), a drive unit (34), a feedback component (35), and a second transmission unit (36). The second signal processing unit (32) is electrically connected to the signal sensor component (31) to process the processed signal sensed by the signal sensor component (31). The second CPU (33) is electrically connected to the second signal processing unit (32) to operate and encode the signal processed by the second signal processing unit (32). The drive unit (34) uses a signal executed by the second CPU (33) to drive a load (37), such as a lamp, an audio and video device and the like, in which the load (37) is electrically connected to the drive unit (34). The feedback component (35) is electrically connected to the drive unit (34) and the second CPU (33) and may detect and transmit a feedback signal formed after the load (37) works to the second CPU (33). The second transmission unit (36) is electrically connected to the second signal processing unit (32) to transmit the feedback signal from the sub-machine (3) to the host (2).

The first transmission unit (23) of the host (2) is provided with a first transmission terminal (231), a first receiving terminal (232), and a switch (233). The first switch (233) is controlled by the first CPU (21) to switch a signal transmission direction to the first transmission terminal (231) and the first receiving terminal (232) and make the host (2) transmit the signal or receive the feedback signal.

To sum up, this invention is indeed available and progressive in the industry and is featured with simple wiring, remote transmission, antijamming, and low cost of construction, and has not been published and not similar to any other product in the market; thus, this invention is made to be improved and practical to meet the requirements of application for protection under patent law.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A remote antijamming transmission device, comprising a host and a sub-machine,
   the host comprising:
   a first CPU processing an address encoding and control signal and all digital signals;
   a first signal processing unit being electrically connected to the first CPU and processing the address encoding and control signal and all analog signals; and
   a first transmission unit transmitting to the sub-machine the analog and digital signals processed by the first signal processing unit;
   the sub-machine comprising:
   a signal sensor component sensing the signal transmitted by the host;
   a second signal processing unit being electrically connected to the signal sensor component to receive the processed signal sensed by the signal sensor component;
   a second CPU being electrically connected to the second signal processing unit to operate and encode the signal processed by the second signal processing unit; and
   a drive unit being electrically connected to the second CPU, in which a signal decoded by the second CPU is used to drive a load electrically connected to the drive unit;
   a signal current transmission line being provided between the host and the sub-machine, the sub-machine being arranged along a path of the signal current transmission line and kept at a distance from the signal current transmission line, and the distance being a range where the signal sensor component senses a signal current transmitted by the host.

2. The remote antijamming transmission device according to claim 1, wherein the signal sensor component comprises a Hall sensor IC and the second signal processing unit processes a signal sensed by the Hall sensor IC and transmits it to the second CPU.

3. The remote antijamming transmission device according to claim 1, wherein the signal sensor component comprises a coil and the second signal processing unit processes a signal sensed by the coil and transmits it to the second CPU.

4. The remote antijamming transmission device according to claim 1, wherein a feedback signal transmission line is further provided between the host and the sub-machine that further comprises a feedback component electrically connected to the drive unit and the second CPU, a second transmission unit is electrically connected to the second signal processing unit, the feedback component detects and transmits a feedback signal from the sub-machine to the second CPU to operate and execute, the feedback signal, after being processed by the second signal processing unit, is transmitted from the second transmission unit to the host, the host is arranged along the path of feedback signal transmission line and kept at a distance from the feedback signal transmission line, the host further comprises a signal sensor component electrically connected to the first transmission unit, the distance is a range where the signal sensor component senses a signal current transmitted by the sub-machine, the first transmission unit of the host is provided with a first receiving terminal to receive the feedback signal, and the signal, after being processed by the first signal processing unit, is transmitted to the first CPU.

5. The remote antijamming transmission device according to claim 4, wherein the first transmission unit of the host is further provided with a first transmission terminal and a first switch, and the first switch is controlled by the first CPU to switch a signal transmission direction to the first transmission terminal and the first receiving terminal.

6. The remote antijamming transmission device according to claim 1, wherein the signal current transmission line is adapted to provide an additional function of feedback, the sub-machine further comprises a feedback component, the feedback component is electrically connected to the drive unit and the second CPU, the second transmission unit is further electrically connected to the second signal processing unit, the feedback component detects and transmits a feedback signal from the sub-machine to the second CPU to operate and execute, the feedback signal, after being processed by the second signal processing unit, is transmitted from the second transmission unit to the host, the first transmission unit of the host is provided with the first receiving terminal to receive the feedback signal, and the signal, after being processed by the first signal processing unit, is transmitted to the first CPU.

7. The remote antijamming transmission device according to claim 6, wherein the first transmission unit of the host is further provided with a first transmission terminal and a first switch, and the first switch is controlled by the first CPU to switch a signal transmission direction to the first transmission terminal and the first receiving terminal.

8. The remote antijamming transmission device according to claim 1, wherein a plurality of sub-machines are arranged at a distance of intervals along the path of signal current transmission line and kept at the distance from the signal current transmission line.

9. The remote antijamming transmission device according to claim 1, wherein an operation panel electrically connected to the first CPU is provided.

* * * * *